(12) United States Patent
Yamada

(10) Patent No.: US 10,503,403 B2
(45) Date of Patent: Dec. 10, 2019

(54) STORAGE CONTROL APPARATUS AND STORAGE SYSTEM

(71) Applicant: FUJITSU LIMITED, Kawasaki-shi, Kanagawa (JP)

(72) Inventor: Hidenori Yamada, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 15/134,717

(22) Filed: Apr. 21, 2016

(65) Prior Publication Data

US 2016/0320976 A1 Nov. 3, 2016

(30) Foreign Application Priority Data

Apr. 30, 2015 (JP) .................................. 2015-092520

(51) Int. Cl.
*G06F 12/00* (2006.01)
*G06F 3/06* (2006.01)
(52) U.S. Cl.
CPC ............ *G06F 3/0605* (2013.01); *G06F 3/061* (2013.01); *G06F 3/065* (2013.01); *G06F 3/067* (2013.01)
(58) Field of Classification Search
CPC .................................. G06F 3/061; G06F 3/065
See application file for complete search history.

(56) References Cited

U.S. PATENT DOCUMENTS

| 8,787,163 B1 * | 7/2014 | Nemavat ................. H04L 12/54 |
| | | 370/231 |
| 2005/0053067 A1 * | 3/2005 | Yasukawa ........... H04L 12/5601 |
| | | 370/389 |
| 2005/0160137 A1 * | 7/2005 | Ishikawa ............. G06F 12/0897 |
| | | 709/203 |
| 2005/0177684 A1 | 8/2005 | Hoshino et al. |
| 2005/0267891 A1 * | 12/2005 | Shimizu ................. G06F 12/023 |
| 2010/0030986 A1 * | 2/2010 | Shinozaki ............. G06F 3/0613 |
| | | 711/162 |
| 2011/0191551 A1 | 8/2011 | Shinozaki et al. |
| 2011/0289261 A1 * | 11/2011 | Candelaria ............. G06F 11/20 |
| | | 711/103 |
| 2016/0014200 A1 * | 1/2016 | Murrish ................ G06F 3/0617 |
| | | 709/219 |

FOREIGN PATENT DOCUMENTS

| JP | 2005-222274 | 8/2005 |
| JP | 2008-271017 A | 11/2008 |
| JP | 2011-158948 | 8/2011 |
| WO | 2014/184606 A1 | 11/2014 |

OTHER PUBLICATIONS

Japanese Office Action dated Oct. 23, 2018 for corresponding Japanese Patent Application No. 2015-092520, with English Translation, 7 pages.

* cited by examiner

*Primary Examiner* — Baboucarr Faal
(74) *Attorney, Agent, or Firm* — Fujitsu Patent Center

(57) ABSTRACT

A control unit determines a storage location of copy target data managed by a first controller module, based on configuration information. When a first transmission buffer included in the first controller module is the storage location of the copy target data, the control unit stores the copy target data in the first transmission buffer. When a second transmission buffer different from the first transmission buffer is the storage location of the copy target data, the control unit stores the copy target data in the second transmission buffer via a corresponding second controller module.

8 Claims, 17 Drawing Sheets

| OFFSET | 0 | 1 | 2 | 3 | 4 | 5 | 6 | 7 |
|---|---|---|---|---|---|---|---|---|
| CM#00 | | | | | | | ▨ | ▨ |
| CM#01 | | | | | | | ▨ | ▨ |
| CM#02 | | | | | | | ▨ | ▨ |
| CM#03 | | | | | | | ▨ | ▨ |

FIG. 8

| CM | REC-BUFFER-RESPONSIBLE CONTROLLER MODULE | | |
|---|---|---|---|
| | BUFFER SET #0 | BUFFER SET #1 | BUFFER SET #2 |
| CM#00 | CM#00 | CM#08 | CM#16 |
| CM#01 | CM#01 | CM#09 | CM#17 |
| CM#02 | CM#02 | CM#10 | CM#18 |
| CM#03 | CM#03 | CM#11 | CM#19 |
| CM#04 | CM#04 | CM#12 | CM#20 |
| CM#05 | CM#05 | CM#13 | CM#21 |
| CM#06 | CM#06 | CM#14 | CM#22 |
| CM#07 | CM#07 | CM#15 | CM#23 |

FIG. 10

| OFFSET | 0 | 1 | 2 | 3 | 4 | 5 | 6 | 7 |
|---|---|---|---|---|---|---|---|---|
| CM#00 | | | | | | | | ▨ |
| CM#01 | | | | | | | | |
| CM#02 | | | | | | | | |
| CM#03 | | | | | | | | |

FIG. 14

| OFFSET | 0 | 1 | 2 | 3 | 4 | 5 | 6 | 7 |
|---|---|---|---|---|---|---|---|---|
| CM#00 | | | | | | | | ▨ |
| CM#01 | | | | | | | | ▨ |
| CM#02 | | | | | | | | ▨ |
| CM#03 | | | | | | | | ▨ |

FIG. 17

STORAGE CONTROL APPARATUS AND STORAGE SYSTEM

CROSS-REFERENCE TO RELATED APPLICATION

This application is based upon and claims the benefit of priority of the prior Japanese Patent Application No. 2015-092520, filed on Apr. 30, 2015, the entire contents of which are incorporated herein by reference.

FIELD

The embodiments discussed herein are related to a storage control apparatus and a storage system.

BACKGROUND

In order to protect data from disasters and other events, data is often backed up to a remote location by remote copying. Remote copying modes include a synchronous mode and an asynchronous mode. In the asynchronous mode, remote copying of data to the copy destination storage apparatus is performed asynchronously with updating of data in the copy source storage apparatus. Further, the asynchronous remote copying mode includes a remote copying mode that does not guarantee the data update sequence and a remote copying mode (sequence-guaranteed remote copying mode) that guarantees the data update sequence.

In the sequence-guaranteed remote copying mode, the copy source storage apparatus uses part of the cache memory of each of controllers thereof as a buffer, and stores Input/Outputs (I/Os) to a copy session in the buffer. Then, the copy source storage apparatus copies data stored in the buffers by the respective controllers of the copy source storage apparatus to the copy destination storage apparatus collectively, that is, in units of buffer sets.

Thus, the copy source storage apparatus is able to copy data to a standby volume (copy destination storage apparatus) located in a remote location, while guaranteeing the data update sequence in accordance with Write I/Os from the host to an operation volume (copy source storage apparatus). Further, since data is transferred via buffers, the copy source storage apparatus may use a low-bandwidth network for the data update capacity.

See, for example, Japanese Laid-open Patent Publications No. 2011-158948 and No. 2005-222274.

Recent storage apparatuses tend to have an increased number of disks so as to provide greater data capacity. Further, such storage apparatuses tend to have an increased number of controllers so as to process a large amount of data. Since each controller includes a buffer used for sequence-guaranteed remote copying, the number of buffers used for sequence-guaranteed remote copying is also increased.

However, in order to guarantee the sequence of remote copying, the copy source storage apparatus transfers data in units of buffer sets when the filling rate of any of buffers exceeds a threshold. That is, an increase in the number of buffers causes a variation in data filling rate between buffers, which results in a reduction in data filling rate on a per buffer set basis.

SUMMARY

According to one aspect, there is provided a storage control apparatus that controls copying of data from a first storage apparatus including a plurality of controller modules to a second storage apparatus, the storage control apparatus including: a memory configured to store configuration information of a buffer set for each of generations corresponding to an update sequence, the buffer set including transmission buffers included in the controller modules; and a processor configured to perform a procedure including: determining a storage location of copy target data managed by a first controller module of the plurality of controller modules, based on the configuration information; when a first transmission buffer included in the first controller module is the storage location of the copy target data, storing the copy target data in the first transmission buffer; and when a second transmission buffer included in a second controller module of the plurality of controller modules different from the first controller module is the storage location of the copy target data, storing the copy target data in the second transmission buffer via the second controller module.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a reception buffer according to the second embodiment;

FIG. 10 illustrates an example of a REC-buffer-responsible controller module table according to the second embodiment;

FIG. 14 illustrates an example of a reception buffer according to the third embodiment;

FIG. 17 illustrates an example of a reception buffer according to the fourth embodiment.

DESCRIPTION OF EMBODIMENTS

Figure 1:
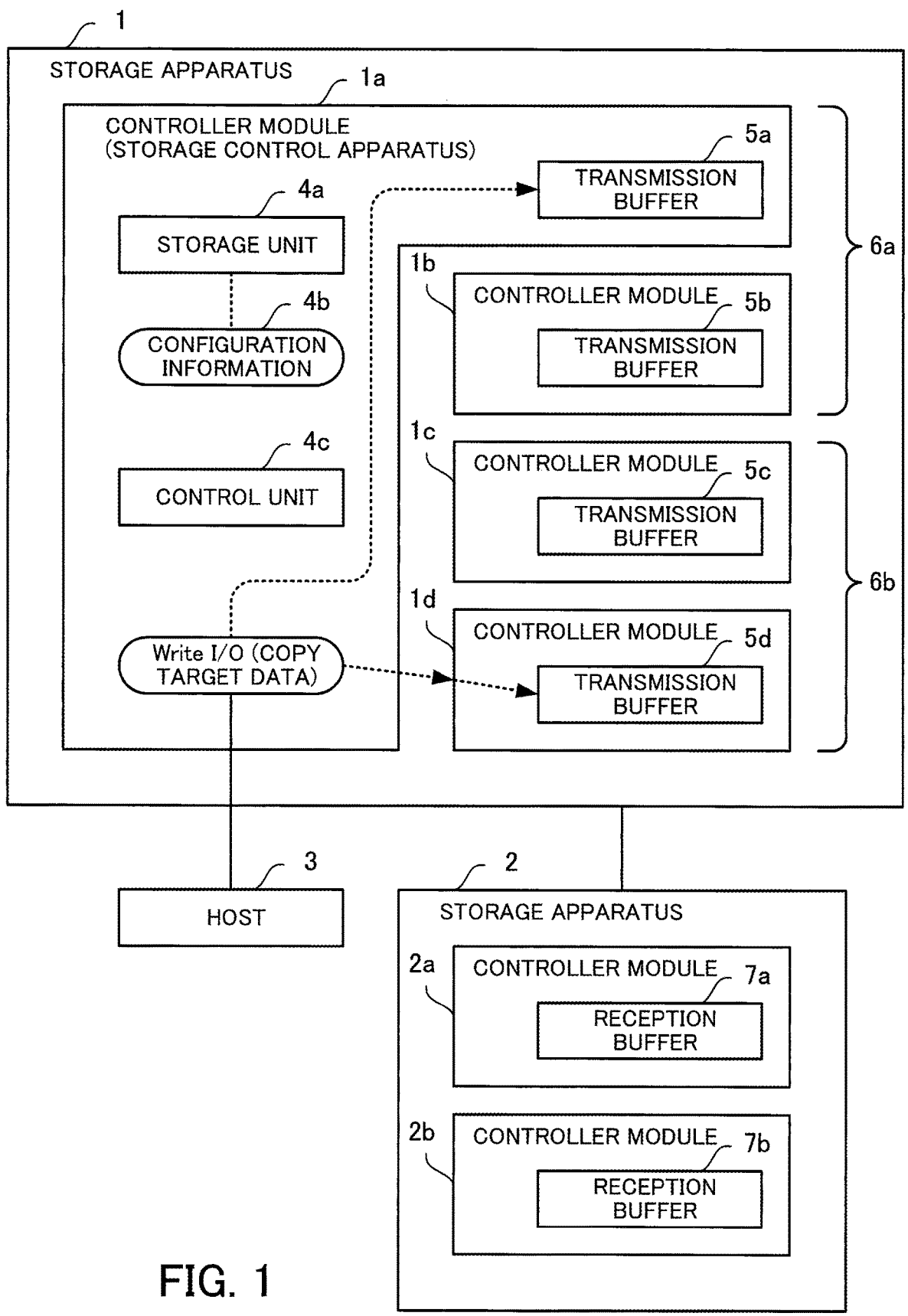
FIG. 1 illustrates an example of the configuration of a storage system according to a first embodiment.

Several embodiments will be described below with reference to the accompanying drawings, wherein like reference numerals refer to like elements throughout.

(a) First Embodiment

First, a storage system of a first embodiment will be described with reference to FIG. 1. FIG. 1 illustrates an example of the configuration of the storage system according to the first embodiment.

The storage system includes storage apparatuses 1 and 2, and a host 3. The storage apparatus 1 is located in a remote location from the storage apparatus 2, and connects to the storage apparatus 2 over a network. The storage system is capable of performing remote copying from the storage apparatus (first storage apparatus) 1 as a copy source storage apparatus to the storage apparatus (second storage apparatus) 2 as a copy destination storage apparatus.

The storage apparatus 1 includes a plurality of controller modules 1a, 1b, 1c, and 1d, and controls storage devices. The storage apparatus 2 includes a plurality of controller modules 2a and 2b, and controls storage devices. Examples of storage devices include solid state drives (SSDs), hard disk drives (HDDs), and the like.

The controller modules 1a, 1b, 1c, and 1d share the control of the storage apparatus 1. The controller modules 1a, 1b, 1c, and 1d are one form of a storage control apparatus that controls copying of data to the copy destination storage apparatus. The controller modules 1a, 1b, 1c, and 1d include transmission buffers 5a, 5b, 5c, and 5d, respectively. The controller modules 2a and 2b are one form of a storage control apparatus that controls copying of data in the copy destination storage apparatus. The controller modules 2a and 2b include reception buffers 7a and 7b, respectively.

Since the controller modules 1a, 1b, 1c, and 1d have the same configuration, the following only describes the controller module 1a. The controller module 1a includes a storage unit 4a and a control unit 4c.

The storage unit 4a stores configuration information 4b. The configuration information 4b is information on the configuration of each buffer set. For example, the configuration information 4b includes information on the number of individual buffers included in each buffer set, the combination of transmission buffers included in each buffer set, and the like. Alternatively, the configuration information 4b may be information on the number of controller modules of the copy destination storage apparatus, the number of controller modules of the copy source storage apparatus, and the like. For example, the number of individual buffers included in each buffer set, the combination of transmission buffers included in each buffer set, and the like are information that may be determined from the number of controller modules of the copy destination storage apparatus, the number of controller modules of the copy source storage apparatus, and the like.

Each of the transmission buffers 5a, 5b, 5c, and 5d is divided into individual buffers. Each buffer set is a buffer group including one or more individual buffers selected from the transmission buffers 5a, 5b, 5c, and 5d so as to have no overlap. For example, a buffer set 6a includes one individual buffer selected from the transmission buffer 5a and one individual buffer selected from the transmission buffer 5b. Further, a buffer set 6b includes an individual buffer selected from the transmission buffer 5c and an individual buffer selected from the transmission buffer 5d.

A buffer set is a buffer group for each of generations corresponding to the update sequence. For example, each of the buffer sets 6a and 6b is a buffer group of one generation. When a predetermined amount of data is stored in a buffer set, the storage apparatus 1 switches the location where data is to be stored to another buffer set. Thus, the storage apparatus 1 achieves asynchronous remote copying with the guaranteed data update sequence, using the buffer sets managed by generation.

The control unit 4c determines a storage location of copy target data managed by the controller module 1a (first controller module), based on the configuration information 4b. The copy target data managed by the controller module 1a is data corresponding to a Write I/O received by the controller module 1a from the host 3, and is data to be copied to the storage apparatus 2.

The location where the copy target data is to be stored (the storage location of the copy target data) is any of individual buffers included in a buffer set to which data is to be written, and is determined based on the configuration information 4b. The control unit 4c is able to specify the current buffer set to which data is to be written, based on the configuration information 4b. Further, the control unit 4c is able to specify individual buffers (transmission buffers) included in each buffer set.

When a transmission buffer 5a (first transmission buffer) included in the controller module 1a is the storage location of the copy target data, the control unit 4c stores the copy target data in the transmission buffer 5a.

When a transmission buffer (second transmission buffer) different from the transmission buffer 5a is the storage location of the copy target data, the control unit 4c stores the copy target data in the transmission buffer via a corresponding controller module (second controller module).

For example, when the current buffer set to which data is to be written is the buffer set 6a, the storage location of the copy target data is a corresponding individual buffer of the transmission buffer 5a or a corresponding individual buffer of the transmission buffer 5b. In this case, since the transmission buffer 5a of the controller module 1a is included in the buffer set 6a, the control unit 4c determines to store the copy target data in the corresponding individual buffer of the transmission buffer 5a.

On the other hand, when the current buffer set to which data is to be written is the buffer set 6b, the storage location of the copy target data is a corresponding individual buffer of the transmission buffer 5c or a corresponding individual buffer of the transmission buffer 5d. In this case, since the transmission buffer 5a of the controller module 1a is not included in the buffer set 6b, the control unit 4c determines to store the copy target data in an individual buffer corresponding to the transmission buffer 5c or the transmission buffer 5d.

Thus, the controller module 1a is able to store the copy target data in a transmission buffer regardless of whether the transmission buffer 5a is included in the buffer set. Accordingly, the storage apparatus 1 may arbitrarily set the size of a buffer set. The size of a buffer set may be set in accordance with the size of the storage apparatus 1 and the storage apparatus 2.

For example, in the case where the size of the storage apparatus 2 is smaller than that of the storage apparatus 1, the storage capacity of the reception buffers 7a and 7b of the storage apparatus 2 might run low when the storage apparatus 1 transmits data stored in a buffer set to the storage apparatus 2. The storage apparatus 1 is able to prevent the storage apparatus 2 from running low on the storage capacity of the reception buffers 7a and 7b, by arbitrarily setting the size of a buffer set.

Further, in the case where the size of the storage apparatus 1 is large, the capacity of the transmission buffer in a buffer set in the storage apparatus 1 is excessively high, which causes a reduction in data filling rate. By arbitrarily setting the size of a buffer set, the storage apparatus 1 is able to improve the data filling rate of the transmission buffers in the buffer set.

In this manner, the storage apparatus 1 is able to prevent a reduction in data filling rate on a per buffer set basis in sequence-guaranteed remote copying.

Note that although the controller modules 1a, 1b, 1c, and 1d serve as the storage control apparatus, the storage control apparatus may be provided independently of the controller modules 1a, 1b, 1c, and 1d.

(b) Second Embodiment

Figure 2:
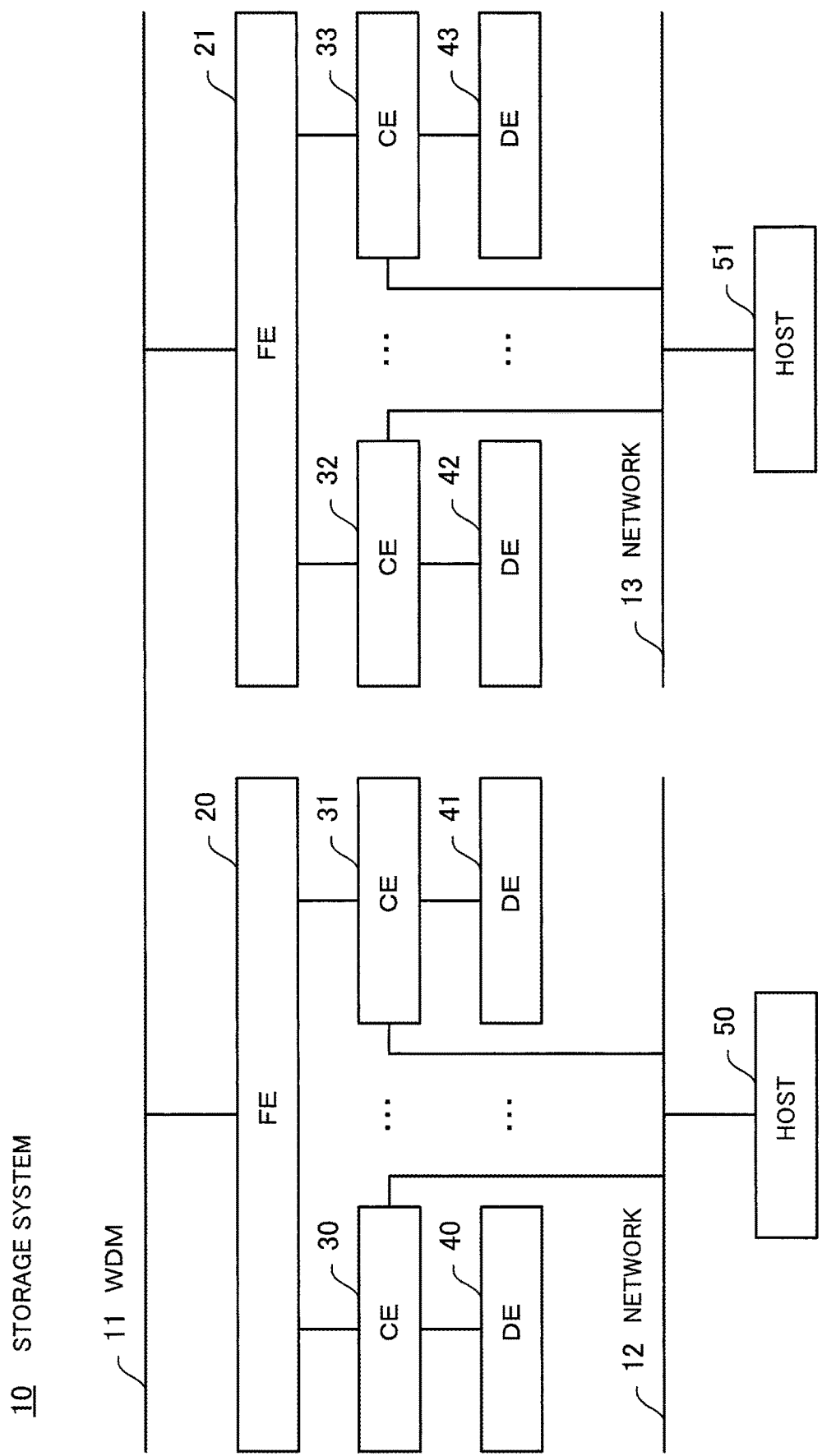
FIG. 2 illustrates an example of the configuration of a storage system according to a second embodiment.

In the following, a storage system 10 of a second embodiment will be described with reference to FIG. 2. FIG. 2 illustrates an example of the configuration of the storage system 10 according to the second embodiment.

The storage system 10 includes a wavelength division multiplexing (WDM) 11 and front-end expanders (FEs) 20 and 21 that connect to the WDM 11. The storage system 10 further includes controller enclosures (CEs) 30 and 31 that connect to the front-end expander 20, a disk enclosure (DE) 40 that connects to the controller enclosure 30, and a disk enclosure 41 that connects to the controller enclosure 31. The storage system 10 further includes controller enclosures 32 and 33 that connect to the front-end expander 21, a disk enclosure 42 that connects to the controller enclosure 32, and a disk enclosure 43 that connects to the controller enclosure 33. The storage system 10 further includes a host 50 that connects to the controller enclosures 30 and 31 via a network 12, and a host 51 that connects to the controller enclosures 32 and 33 via a network 13.

The WDM 11 is a high-speed, large-capacity network. The front-end expanders 20 and 21 control the communication among the controller enclosures 30, 31, 32, and 33. Each of the controller enclosures 30, 31, 32, and includes controller modules (CMs). Each of the disk enclosures 40, 41, 42 and 43 includes storage devices such as HDDs and SSDs. The host 50 is capable of issuing an I/O request (including a Write I/O and a Read I/O) to the controller enclosures 30 and 31. The host 51 is capable of issuing an I/O request to the controller enclosures 32 and 33.

The front-end expander 20, the controller enclosures 30 and 31, and the disk enclosures 40 and 41 are elements of a copy source storage apparatus. The front-end expander 21, the controller enclosures 32 and 33, and the disk enclosures 42 and 43 are elements of a copy destination storage apparatus. The copy source storage apparatus and the copy destination storage apparatus are located at geographically apart locations. It is possible to perform sequence-guaranteed remote copying from the copy source storage apparatus to the copy destination storage apparatus.

Figure 3:
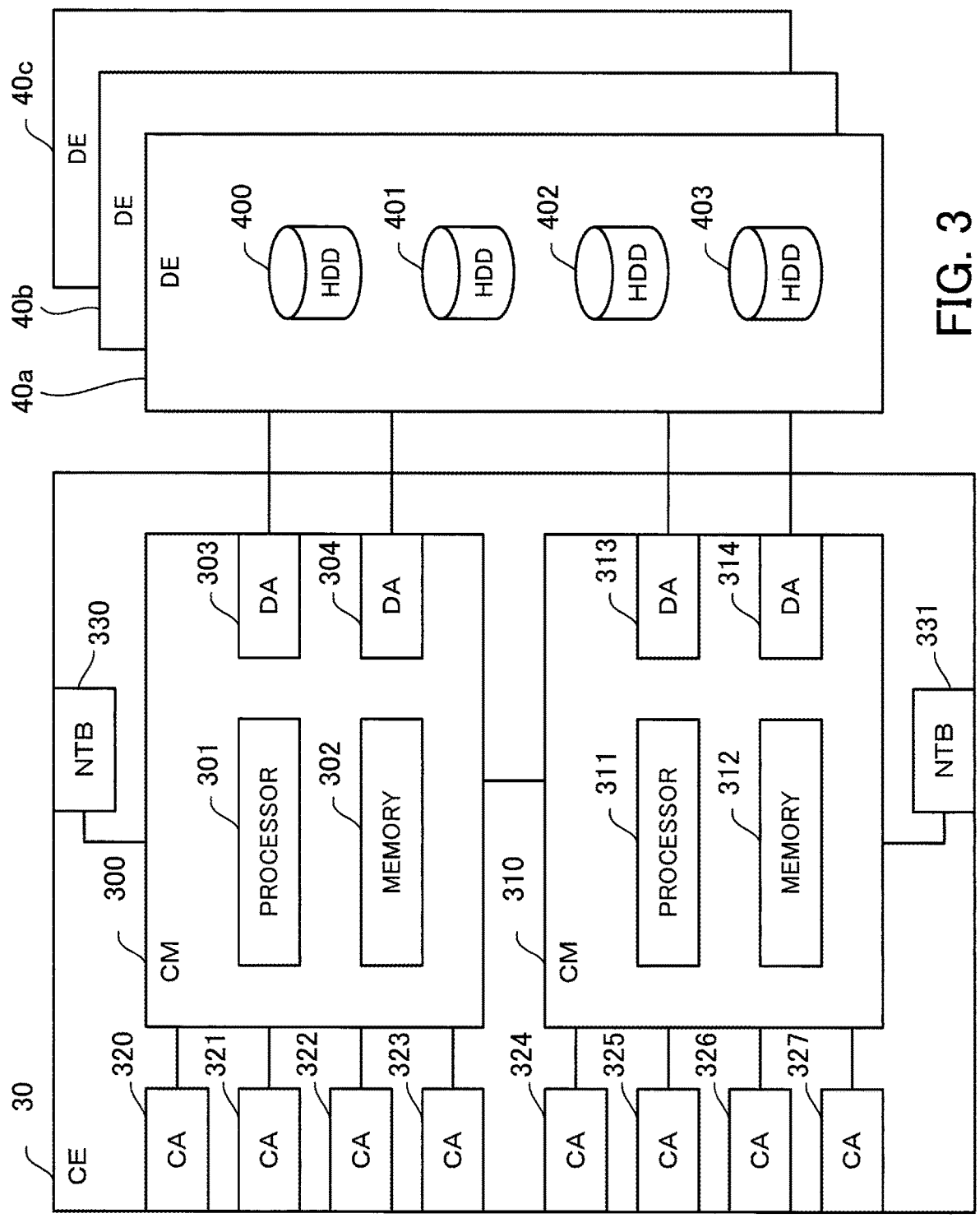
FIG. 3 illustrates an example of the configuration of a controller enclosure and a disk enclosure according to the second embodiment.

Next, a storage apparatus according to the second embodiment will be described with reference to FIG. 3. FIG. 3 illustrates an example of the configuration of a controller enclosure and a disk enclosure according to the second embodiment.

The controller enclosure 30 connects to one or more disk enclosures 40. For example, the controller enclosure 30 connects to the disk enclosures 40a, 40b, and 40c. Each of the disk enclosures 40a, 40b, and 40c includes one or more storage devices. For example, the disk enclosure 40a includes HDDs 400, 401, 402, and 403.

The controller enclosure 30 includes controller modules 300 and 310, channel adapters (CAs) 320 through 323, channel adapters 324 through 327, and non-transparent bridges (NTBs) 330 and 331. The controller modules 300 and 310 are able to connect to each other so as to share the workload. Note that although the controller enclosure 30 includes two controller modules 300 and 310, the configuration is not limited thereto. The controller enclosure 30 may include either one of the controller modules 300 and 310, or may include three or more controller modules (for example, four or eight controller modules).

The controller modules 300 and 310 serve as a storage control apparatus that controls writing of data to a storage device and reading of data from a storage device. Further, the controller modules 300 and 310 serve as a storage control apparatus that controls sequence-guaranteed remote copying from the copy source storage apparatus to the copy destination storage apparatus.

The channel adapters 320 through 323 serve as a communication interface between the controller module 300 and an external apparatus (for example, the host 50). The channel adapters 324 through 327 serve as a communication interface between the controller module 310 and an external apparatus. The NTB 330 is responsible for direct memory access (DMA) transfer from the controller module 300 to the front-end expander 20. The NTB 331 is responsible for DMA transfer from the controller module 310 to the front-end expander 20.

The controller module 300 includes a processor 301, a memory 302, and disk adapters (DAs) 303 and 304. The controller module 310 includes a processor 311, a memory 312, and disk adapters 313 and 314. Note that the controller module 310 has the same configuration as the controller module 300, and therefore the description below of the controller module 300 applies to the controller module 310 as well.

The processor 301, the memory 302, and the disk adapters 303 and 304 are connected to each other via a bus (not illustrated). The processor 301 controls the overall operation of the controller module 300. Note that the processor 301 may be a multiprocessor. The processor 301 may be, for example, a central processing unit (CPU), a micro processing unit (MPU), a digital signal processor (DSP), an application specific integrated circuit (ASIC), or a programmable logic device (PLD). Alternatively, the processor 301 may be a combination of two or more selected from CPU, MPU, DSP, ASIC, and PLD.

The memory 302 holds data upon reading data from the storage devices included in the disk enclosures 40a, 40b, and 40c, and serves as a buffer for writing data to the storage devices. The memory 302 also serves as a transmission buffer (remote equivalent copy (REC) buffer described below) of the copy source storage apparatus in sequence-guaranteed remote copying. Further, the memory 302 stores user data and control information.

The memory 302 includes a RAM (random access memory) and a non-volatile memory, for example. The RAM serves as a primary storage device of the controller module 300. The RAM temporarily stores at least part of an operating system program, firmware, and application programs that are executed by the processor 301. The RAM also stores various types of data that are used for processing by the processor 301. The RAM may include a cache memory, separately from a memory for storing various types of data.

The non-volatile memory retains stored data even when power of the controller module 300 is removed. Examples of non-volatile memories include a semiconductor memory device (such as electrically erasable and programmable read only memory (EEPROM), flash memory, and the like), HDD, and so on. The non-volatile memory serves as a secondary storage device of the controller module 300. The non-volatile memory stores the operating system program, firmware, application programs, and various types of data.

Examples of peripheral devices connected to the bus include an input and output interface and a communication interface. The input and output interface is connected to an input and output device so as to perform input and output operations. The input and output interface transmits signals and data transmitted from storage devices, such as the HDDs and the like, to the processor 301 and the memory 302. Further, the input and output interface outputs signals received from the processor 301, to other control units and output devices connected to the controller module 300. The communication interface transmits data to and receives data from the other controller module (controller module 310) in the controller enclosure 30.

The disk adapters 303 and 304 perform interface control (access control) for the storage devices included in the disk enclosures 40a, 40b, and 40c.

With the hardware configuration described above, it is possible to implement the processing functions of the controller modules 300 and 310. Note that the controller module 1a of the first embodiment may be implemented with the same hardware configuration as that of the controller modules 300 and 310.

Although only the controller enclosure 30 has been describe, the same applies to the controller enclosures 31, 32, and 33.

Figure 4:
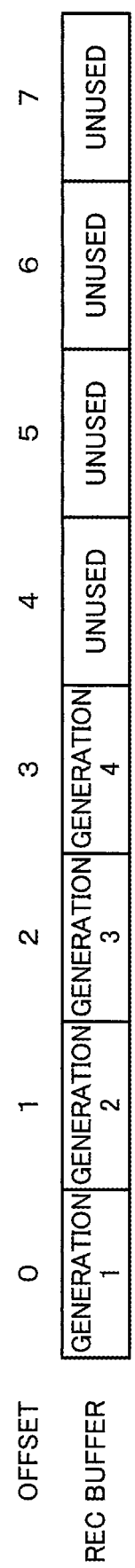
FIG. 4 illustrates an example of a remote equivalent copy (REC) buffer according to the second embodiment.

In the following, a transmission buffer will be described with reference to FIG. 4. FIG. 4 illustrates an example of a REC buffer according to the second embodiment.

The REC buffer is a transmission buffer in the controller module 300. The REC buffer includes one or more individual buffers of a predetermined size (for example, 8 MB). For example, the illustrated REC buffer includes eight individual buffers, and each individual buffer is identifiable by its offset. The individual buffer with an offset "0" stores first-generation copy data, and the individual buffer with an offset "1" stores second-generation copy data that is newer than the first-generation copy data. Similarly, the individual buffer of an offset "2" and the individual buffer of an offset "3" store third-generation copy data and fourth-generation copy data, respectively. The individual buffers with an offset "4" through an offset "7" are in an unused state in which no copy data is stored. One of unused individual buffers is selected to store copy data of a new generation. Further, data is transferred sequentially, beginning with the oldest generation. The individual buffers whose data is transferred are released and returned to an unused state.

Note that the number of individual buffers is merely an example. For example, there may be 256 individual buffers.

Figure 5:
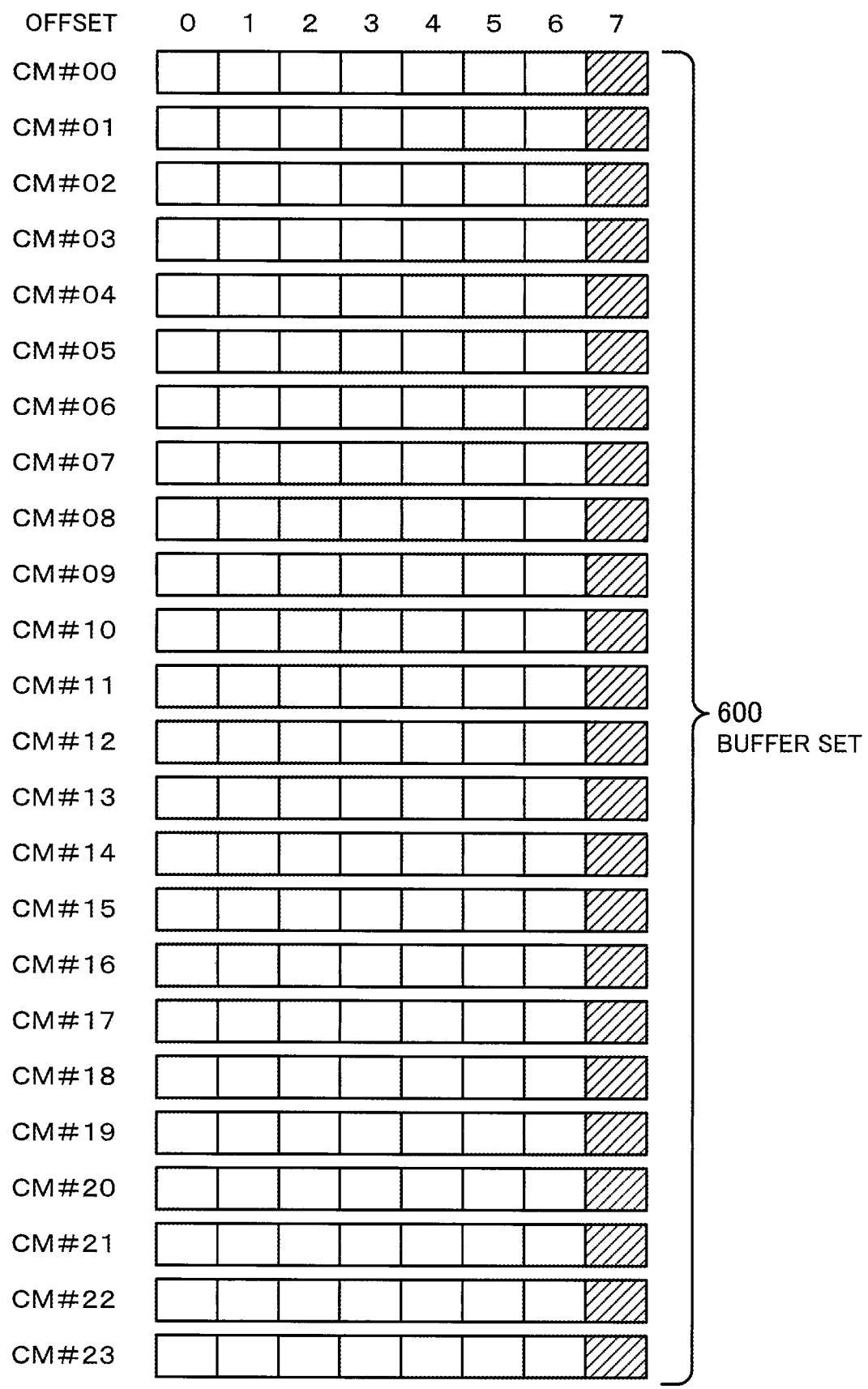
FIG. 5 illustrates an example of a buffer set according to the second embodiment.

In the following, a buffer set will be described with reference to FIG. 5. FIG. 5 illustrates an example of a buffer set according to the second embodiment.

Each individual buffer forms a buffer set together with individual buffers of other controller modules, and the buffer set is managed by generation. For example, a buffer set 600 is a buffer set as a group of single individual buffers (individual buffers with an offset "7" indicated by hatching in FIG. 5) of the 24 respective controller modules, namely, controller modules #00 through #23. Note that "#nn" following each controller module is identification information for uniquely identifying the controller module. The number of individual buffers included in the buffer set 600 is "24", which corresponds to the number of controller modules of the copy source storage apparatus.

A buffer set is a buffer group formed for each of generations corresponding to the update sequence. For example, the buffer set 600 is a buffer group of one generation. When a predetermined amount of data is stored in a buffer set, the storage apparatus switches the location where data is to be stored to another buffer set. Thus, the copy source storage apparatus achieves asynchronous remote copying with the guaranteed data update sequence, using the buffer sets managed by generation.

In the case of the buffer set 600, a large amount of data is transferred at one time. Thus, if the copy destination storage apparatus has a small number of controller modules, the reception buffer of the copy destination storage apparatus might run low. Further, a generational change of buffer sets occurs when a predetermined period of time has elapsed, when the data storage amount of a specific individual buffer has exceeded a threshold, or when other specific events have occurred. This causes a variation in data storage amount between individual buffers. Therefore, the data filling rate of the buffer set 600 is not increased.

Accordingly, it is desired to form a buffer set smaller than the buffer set 600.

Figure 6:
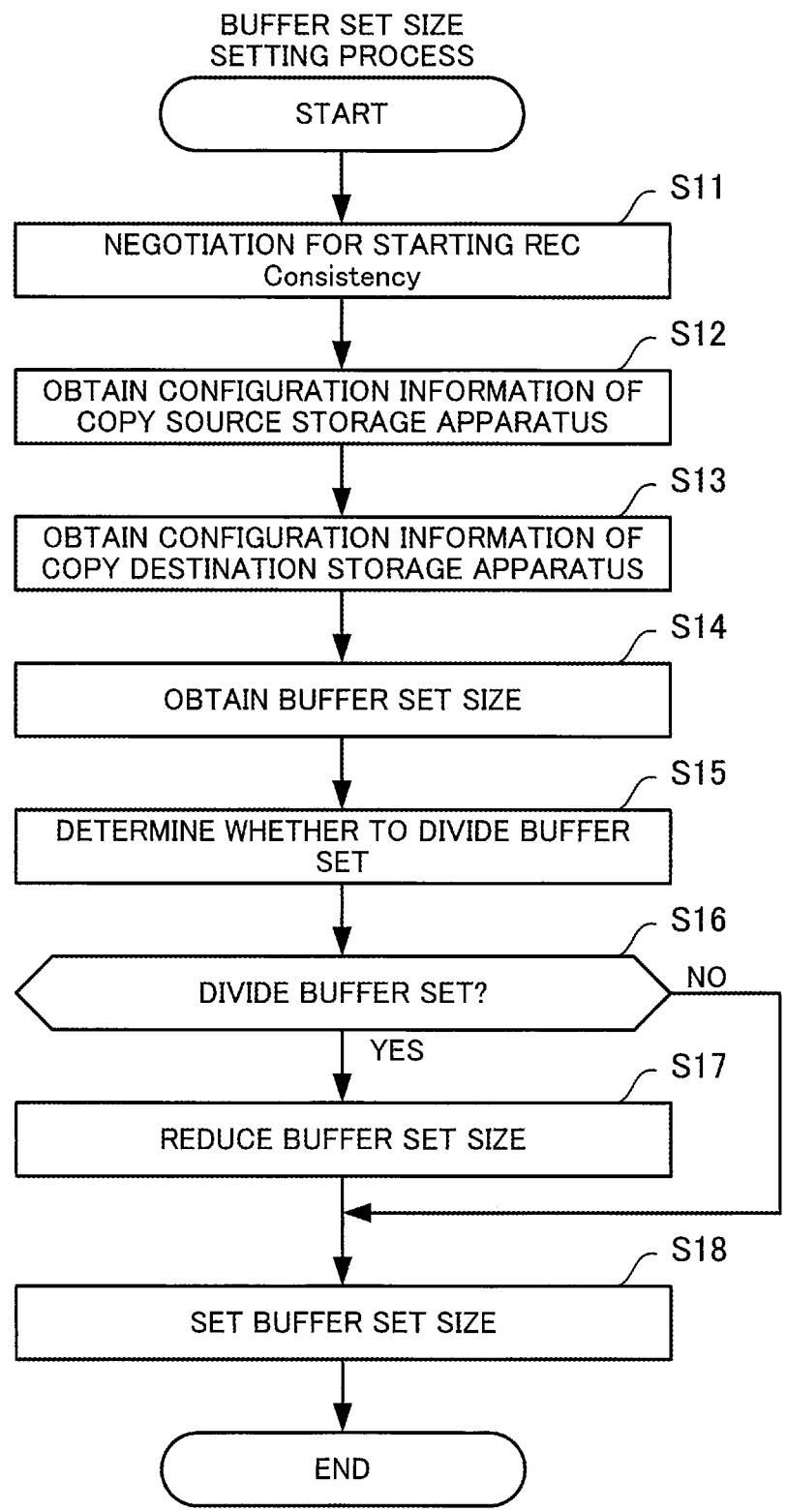
FIG. 6 is a flowchart of a buffer set size setting process according to the second embodiment.

In the following, a buffer set size setting process for setting the size of a buffer set will be described with reference to FIG. 6. FIG. 6 is a flowchart of a buffer set size setting process according to the second embodiment.

The buffer set size setting process is a process for setting the size of a buffer set. The buffer set size setting process is executed by a copy master control unit when needed, such as when configuring the settings of sequence-guaranteed remote copying. Note that the copy master control unit is a control unit of a copy master controller module. The copy master controller module is a predetermined one of the controller modules of the copy source storage apparatus. For example, the copy master controller module is the controller module #00 of the controller modules #00 through #23. In the following description, it is assumed that the controller module 300 is a copy master controller module. The processor 301 executes a predetermined program stored in the memory 302 so as to implement the copy master control unit.

(Step S11) The copy master control unit negotiates with the copy source storage apparatus to start REC Consistency (sequence-guaranteed remote copying).

(Step S12) The copy master control unit obtains configuration information of the copy source storage apparatus. For example, the configuration information of the copy source storage apparatus includes the number of controller modules of the copy source storage apparatus.

(Step S13) The copy master control unit obtains configuration information of the copy destination storage apparatus. For example, the configuration information of the copy destination storage apparatus includes the number of controller modules of the copy destination storage apparatus.

(Step S14) The copy master control unit obtains the size of a buffer set of the copy source storage apparatus. The size of a buffer set may be calculated based on the configuration information of the copy source storage apparatus, or may be a preset size.

(Step S15) The copy master control unit determines whether to divide a buffer set. For example, the copy master control unit determines whether to divide a buffer set by evaluating the size of the buffer set. More specifically, from the viewpoint of preventing the reception buffer from running low, if the size of the buffer set is excessively greater than the size of the reception buffer, the copy master control unit determines to divide the buffer set. However, this does not apply when the buffer set size is the minimum value (when the buffer set includes only one individual buffer). Note that the size of the reception buffer may be obtained as configuration information of the copy destination storage apparatus, or may be calculated based on configuration information of the copy destination storage apparatus. Further, from the viewpoint of improving the data filling rate of the buffer set, the copy master control unit compares the data filling rate between individual buffers included in a buffer set, and determines to divide the buffer set if there is a great variation.

(Step S16) If the copy master control unit determines to divide the buffer set, the process proceeds to step S17. If the copy master control unit determines not to divide the buffer set, the process proceeds to step S18.

(Step S17) The copy master control unit divides the buffer set so as to reduce the buffer set size. For example, when the number of controller modules is "24" and the buffer set size is "24", the copy master control unit divides the buffer set into two buffer sets so as to reduce the buffer set size to "12". Similarly, the copy master control unit may divide the buffer set into three buffer sets so as to reduce the buffer set size to "8", and may divide the buffer set into four buffer sets so as to reduce the buffer set size to "6". The number of buffer sets into which each buffer set is divided (the division number) may be set in a table in advance so as to be referenced from the configuration information of the copy source storage apparatus and the configuration information of the copy destination storage apparatus.

(Step S18) The copy master control unit sets the reduced buffer set size as the buffer set size of the copy source storage apparatus. Then, the buffer set size setting process ends.

Figure 7:
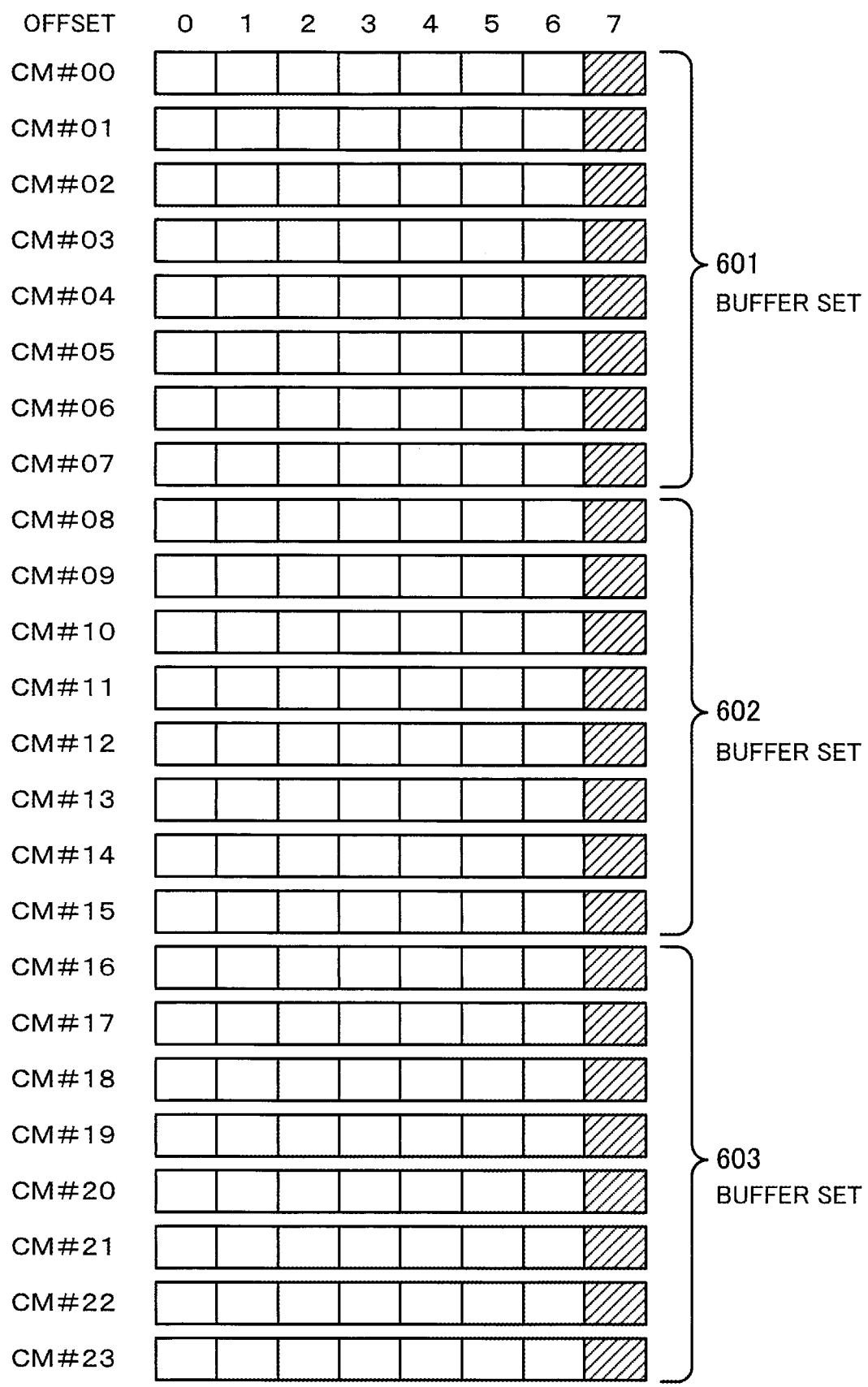
FIG. 7 illustrates an example of a buffer set having a reduced size according to the second embodiment.

In the following, a buffer set whose size is reduced by a buffer set size setting process will be described with reference to FIG. 7. FIG. 7 illustrates an example of a buffer set having a reduced size according to the second embodiment.

A buffer set 601 is a buffer set as a group of single individual buffers (individual buffers with an offset "7" indicated by hatching in FIG. 7) of the 8 respective controller modules, namely, controller modules #00 through #07. Accordingly, the number of individual buffers included in the buffer set 601 is "8", which corresponds to the controller modules #00 through #07. The same applies to the buffer sets 602 and 603.

The buffer sets 601, 602, and 603 are of different generations. Accordingly, as for the REC buffers of the controller modules #00 through #23, since the division number is "3" and the number of offsets is "8", buffer sets for 24 generations are formed.

With the buffer sets 601, 602, and 603, it is possible to reduce the amount of data to be transferred at one time, which reduces the risk of the reception buffer of the copy destination storage apparatus running low. Further, with the buffer sets 601, 602, and 603, it is possible to improve the data filling rate, as compared to the buffer set 600.

Figure 8:
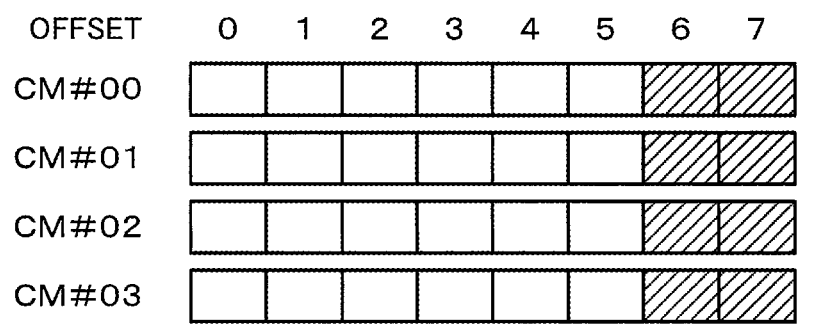

In the following, a reception buffer that stores copy data transferred from a buffer set will be described with reference to FIG. 8. FIG. 8 illustrates an example of a reception buffer according to the second embodiment.

The reception buffer illustrated in FIG. 8 is of a copy destination storage apparatus including four controller modules. The reception buffer is set in REC buffers of the respective controller modules. Since the number of offsets is "8" and the number of controller modules is "4", the size of the reception buffer is "32 (=8×4)".

Accordingly, even when data with a buffer set size of "8" is transferred from the buffer set 601 of FIG. 7, it is possible to accept data transfer 4 (=32/8) times. That is, a reduction in buffer set size reduces the risk of the reception buffer running low.

Figure 9:
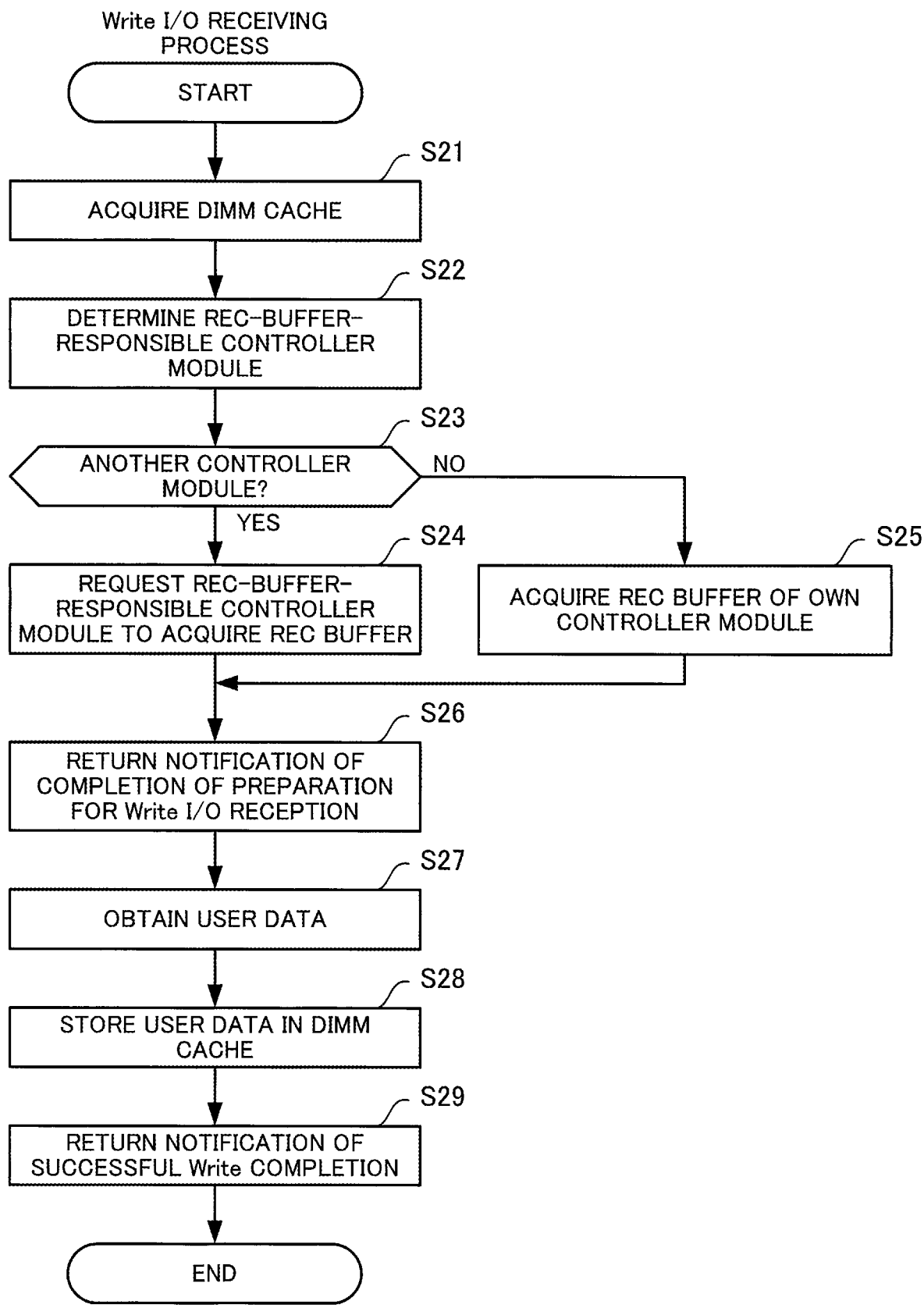
FIG. 9 is a flowchart of a Write I/O receiving process according to the second embodiment.

In the following, a Write I/O receiving process will be described with reference to FIG. 9. FIG. 9 is a flowchart of a Write I/O receiving process according to the second embodiment.

The Write I/O receiving process is a process executed by a controller module that has received a Write I/O, in response to the reception of the Write I/O from the host 50. The Write I/O receiving process is executed by a control unit. Note that in the following description, it is assumed that the controller module 300 is the controller module that has received a Write I/O. The processor 301 executes a predetermined program stored in the memory 302 so as to implement the control unit.

(Step S21) The control unit acquires a dual inline memory module (DIMM) cache. The DIMM cache is contained in the memory 302.

(Step S22) The control unit determines a controller module (REC-buffer-responsible controller module) responsible for a REC buffer capable of storing copy data in a buffer set of the most recent generation. For example, when the REC buffer of the controller module 300 is included in the buffer set, the controller module 300 is the REC-buffer-responsible controller module. On the other hand, when the REC buffer of the controller module 300 is not included in the buffer set, another controller module is the REC-buffer-responsible controller module. More specifically, when the controller module 300 is the controller module #00 and the buffer set 601 is of the most recent generation, the controller module #00 is the REC-buffer-responsible controller module (see FIG. 7) On the other hand, when the controller module 300 is the controller module #00 and the buffer set 602 is of the most recent generation, the controller module #00 is not the REC-buffer-responsible controller module. In this case, the REC-buffer-responsible controller module is one of the controller modules #08 through #15.

(Step S23) If the REC-buffer-responsible controller module is another controller module, the process proceeds to step S24. If the REC-buffer-responsible controller module is not another controller module, the process proceeds to step S25.

(Step S24) The control unit requests the REC-buffer-responsible controller module to acquire a REC buffer (individual buffer).

(Step S25) The control unit acquires the REC buffer (individual buffer) of the controller module 300 serving as the REC-buffer-responsible controller module.

(Step S26) The control unit returns a notification of completion of preparation for Write I/O reception to the host 50.

(Step S27) The control unit obtains user data from the host 50. Note that the user data corresponds to copy data to be transferred to the copy destination storage apparatus.

(Step S28) The control unit stores the user data in the DIMM cache.

(Step S29) The control unit returns a notification of successful Write completion to the host 50. Then, the Write I/O receiving process ends.

After the completion of the Write I/O receiving process, the control unit writes the user data stored in the DIMM cache to the storage device asynchronously with the notification of successful Write completion. Further, after the completion of the Write I/O receiving process, the control unit transfers the user data stored in the DIMM cache to the REC buffer asynchronously with the notification of successful Write completion.

Note that the REC-buffer-responsible controller module may be determined by referring to a table (REC-buffer-responsible controller module table) storing a list of REC-buffer-responsible controller modules. For example, the REC-buffer-responsible controller module table may be provided in advance or may be generated when dividing a buffer set. In the following, the REC-buffer-responsible controller module table will be described with reference to FIG. 10. FIG. 10 illustrates an example of a REC-buffer-responsible controller module table according to the second embodiment.

The REC-buffer-responsible controller module table stores a REC-buffer-responsible controller module of each controller module for each buffer set of the most recent generation. For example, the REC-buffer-responsible controller module of the controller module #00 is: the controller module #00 (the controller module 300) when the buffer set #0 is of the most recent generation; the controller module #08 (another controller module) when the buffer set #1 is of the most recent generation; and the controller module #16 (another controller module) when the buffer set #2 is of the most recent generation. Note that "#n" following each buffer set is identification information for uniquely identifying the buffer set.

The control unit is able to determine a REC-buffer-responsible controller module in step S22 of the Write I/O receiving process, by referring to the REC-buffer-responsible controller module table.

In this manner, the storage system 10 is able to prevent a reduction in data filling rate on a per buffer set basis in sequence-guaranteed remote copying, by reducing the buffer set size.

For example, if the buffer set size is excessively large, it is often the case that when one of individual buffers is full (one of individual buffers has a filling rate greater than a threshold), other buffers are empty or store a very small amount of data. Further, a variation in filling rate between individual buffers causes a variation in workload between controller modules. This results in an imbalance in the workload. Further, recent storage apparatuses need to provide extensibility, and the number of controller modules may be sequentially increased even after installation of the storage apparatuses. Such extensibility makes a variation in filling rate between individual buffers more prominent as the size of the copy source storage apparatus is increased and the number of controller modules is increased.

However, with the storage system 10, it is possible to solve problems caused by a reduction in data filling rate on a per buffer set basis, by reducing the buffer set size.

(c) Third Embodiment

In the following, a storage system according to a third embodiment will be described with reference to FIGS. 11 through 14. The storage system of the second embodiment performs a buffer set size reduction only once. The storage system of the third embodiment is different from the storage system of the second embodiment in being able to perform a buffer set size reduction twice or more. The storage system of the third embodiment uses operation information when determining whether to reduce the buffer set size.

Figure 11:
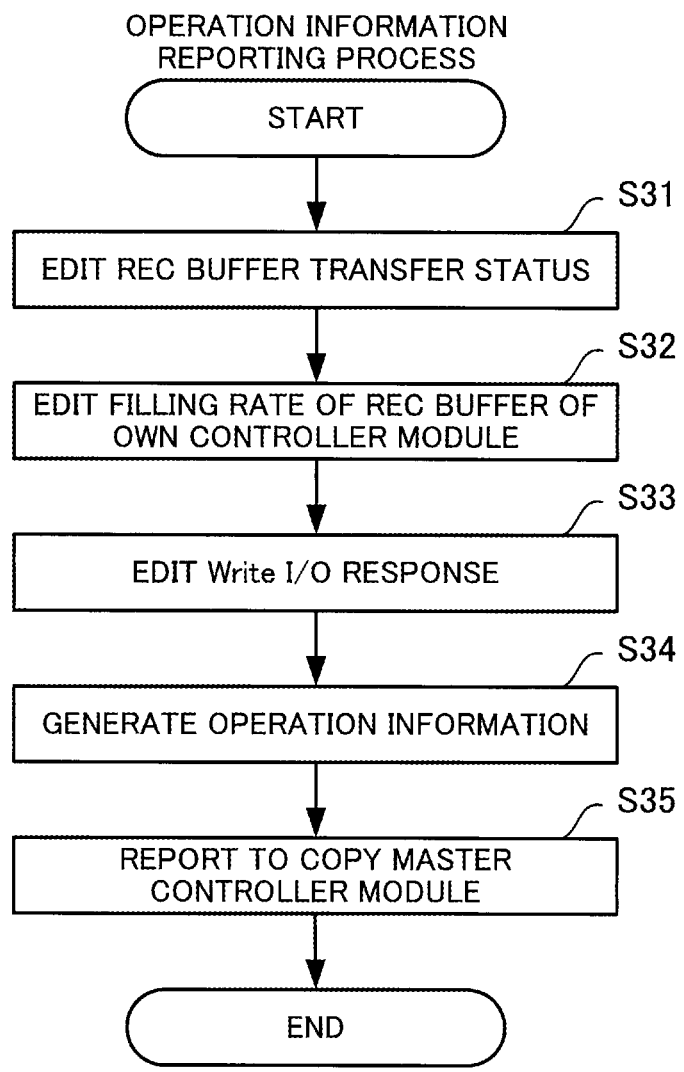
FIG. 11 is a flowchart of an operation information reporting process according to a third embodiment.

First, an operation information reporting process for collecting operation information will be described with reference to FIG. 11. FIG. 11 is a flowchart of an operation information reporting process according to the third embodiment. The operation information reporting process is a process executed regularly or irregularly by each controller module of the copy source storage apparatus. The process may be executed regularly at predetermined time intervals (for example, time intervals of 10 ms) or the like. Further, the process may be executed in response to reception of a Write I/O from the host 50 or the like.

The operation information reporting process is executed by the control unit of each controller module. Note that in the case where the controller module 300 executes an operation information reporting process, the processor 301 executes a predetermined program stored in the memory 302 so as to implement the control unit.

(Step S31) The control unit edits a REC buffer transfer status. The REC buffer transfer status is information indicating whether data is transferred from a REC buffer.

(Step S32) The control unit edits the filling rate of the REC buffer (individual buffer) of the own controller module. The filling rate of the REC buffer is information indicating the percentage of the stored data amount with respect to the storage capacity of the REC buffer (individual buffer).

(Step S33) The control unit edits a write I/O response. The Write I/O response is information indicating the average response time to a Write I/O.

(Step S34) The control unit generates operation information. The operation information includes the REC buffer transfer status, the filling rate of the REC buffer (individual buffer) of the own controller module, and the Write I/O response.

(Step S35) The control unit reports the operation information to the copy master controller module. Then, the operation information reporting process ends.

Thus, the copy master controller module is able to collect operation information from each controller module of the copy source storage apparatus.

Figure 12:
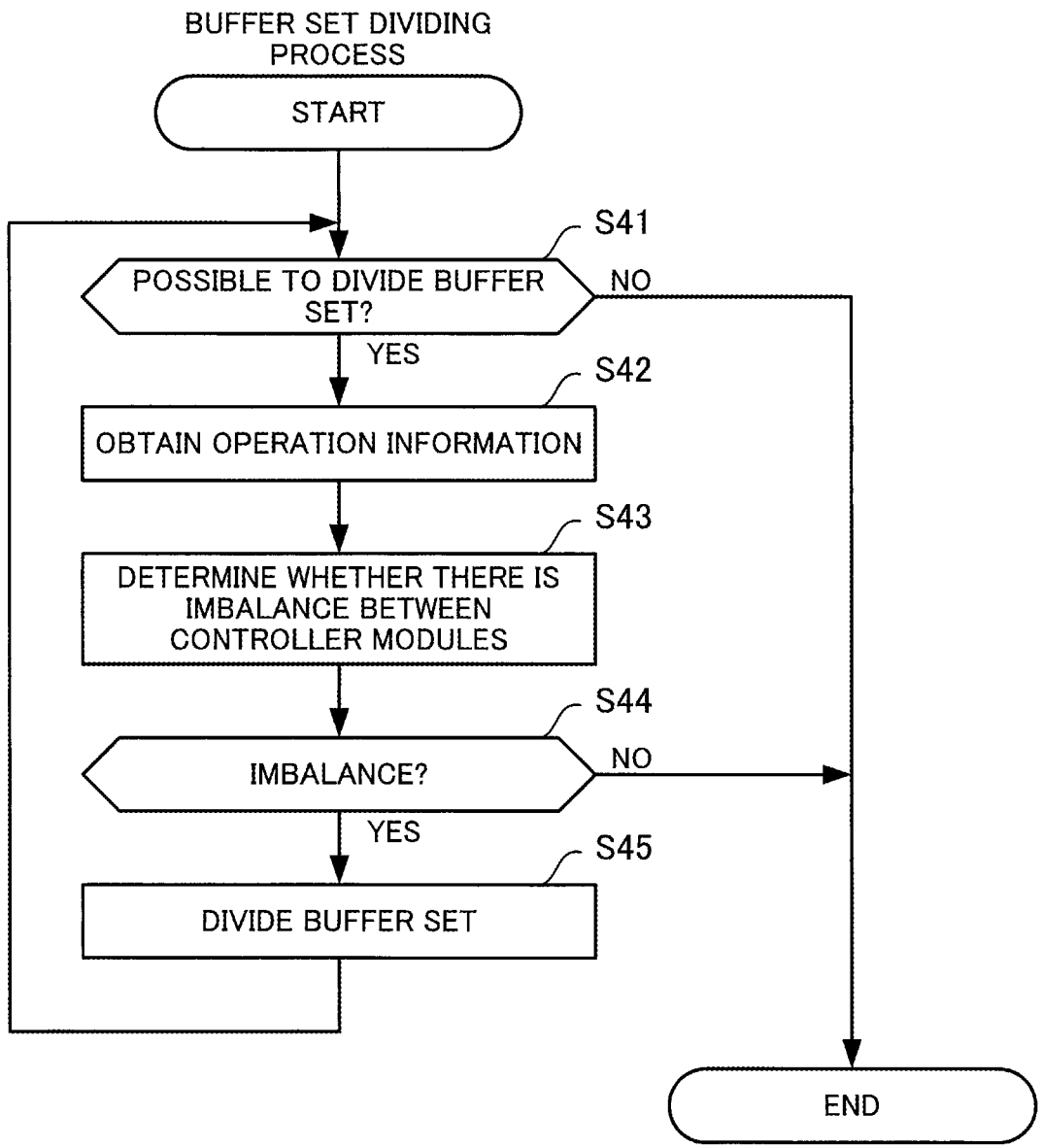
FIG. 12 is a flowchart of a buffer set dividing process according to the third embodiment.

In the following, a buffer set dividing process will be described with reference to FIG. 12. FIG. 12 is a flowchart of a buffer set dividing process according to the third embodiment. The buffer set dividing process is a process for dividing a buffer set into smaller buffer sets. The buffer set dividing process is executed regularly or irregularly by the copy master controller module. The process may be executed regularly at predetermined time intervals (for example, time intervals of 24 hours), at scheduled time (for example, at midnight on May 20), or the like. The process may be executed irregularly in response to reception of an execution request from the host 50, detection of a change to the configuration of the copy source storage apparatus, detection of an idle state, or the like.

Note that in the case where the controller module 300 executes a buffer set dividing process as a copy master controller module, the processor 301 executes a predetermined program stored in the memory 302 so as to implement the copy master control unit.

(Step S41) The copy master control unit determines whether it is possible to divide a buffer set. If the copy master control unit determines that it is possible to divide the buffer set, the process proceeds to step S42. If the copy master control unit determines that it is not possible to divide the buffer set, the buffer set dividing process ends.

For example, the copy master control unit determines that it is possible to divide the buffer set when the buffer set size is "2" or greater, and determines that it is not possible to divide the buffer set when the buffer set size is "1". Note that the minimum value of the buffer set size may be set such that a determination of whether it is possible to divide a buffer set is made based on comparison with the set value.

(Step S42) The copy master control unit obtains operation information collected from each controller module.

(Step S43) The copy master control unit determines whether there is an imbalance in the REC buffer filling rate between controller modules on a per buffer set basis. For example, the copy master control unit is able to determine whether there is an imbalance in the REC buffer filling rate, by statistically evaluating the REC buffer filling rate of each controller module and comparing the evaluation results with a predetermined threshold. The statistical evaluation may include variance calculation and the like, for example.

The copy master control unit collects, from each controller module, operation information including the REC buffer transfer status, the filling rate of the REC buffer (individual buffer) of the controller module, and the Write I/O response. The copy master control unit may determine whether there is an imbalance in the REC buffer filling rate using all the parameters, or any selected parameter.

Note that the determination of an imbalance in the REC buffer filling rate may be performed on all the buffer sets that may be the subjects of the determination, or a buffer set that is selected according to a predetermined criterion (for example, a buffer set that is one generation older than the most recent generation).

(Step S44) If the copy master control unit determines that there is an imbalance in the REC buffer filling rate between controller modules, the process proceeds to step S45. If the copy master control unit determines that there is not an imbalance in the REC buffer filling rate between controller modules, the buffer set dividing process ends.

(Step S45) The copy master control unit divides the buffer set (into two or three buffer sets, for example) so as to reduce the buffer set size. Then, the process returns to step S41. Note that the division number may be set in advance. For example, the copy master control unit may determine the division number, by referring to a reference table defining the division number. For example, the reference table defines that, as for the buffer set size of "24", each buffer set is divided into three buffer sets at the first division, into two buffer sets at the second division, into two buffer sets at the third division, and into two buffer sets at the fourth division.

Figure 13:
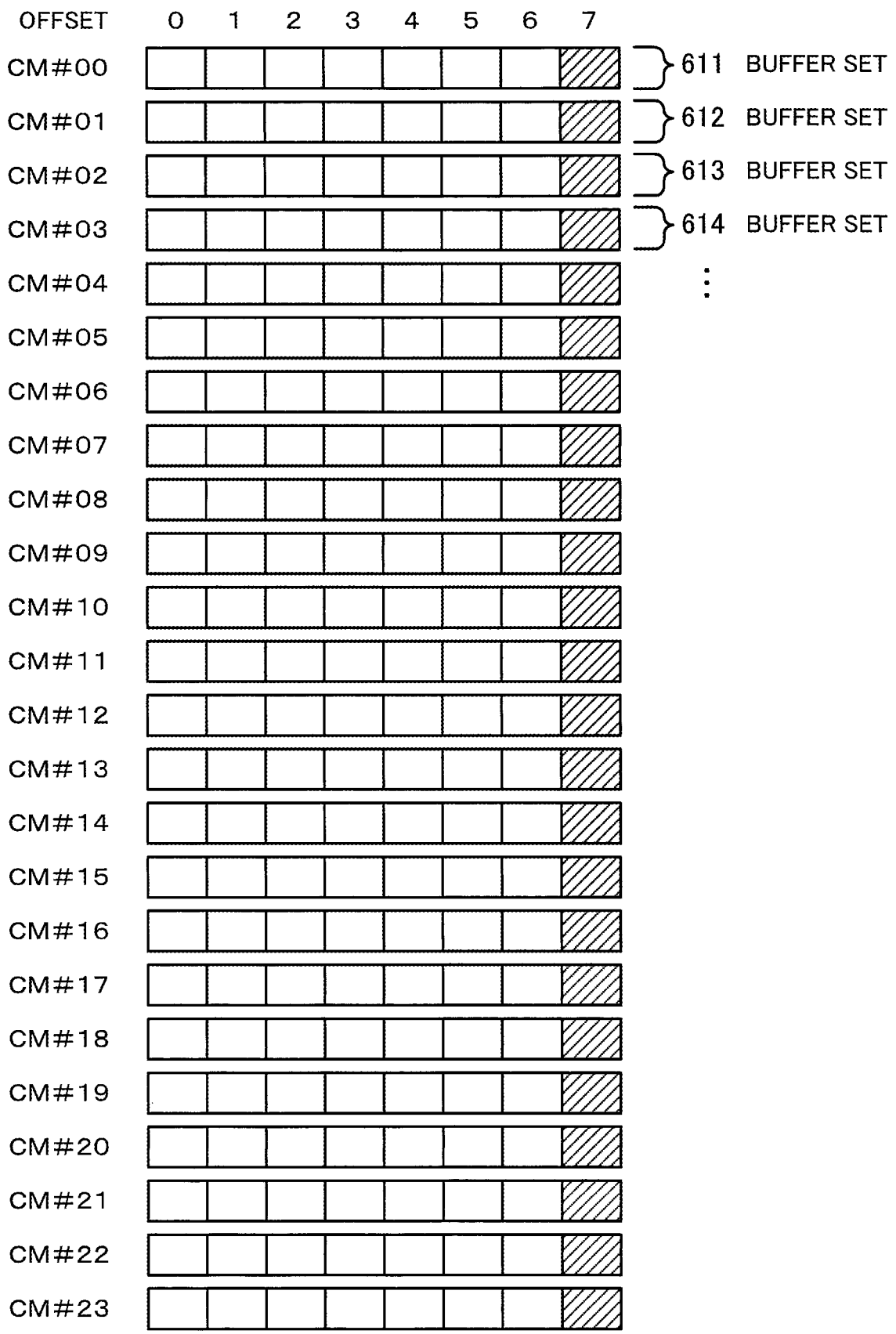
FIG. 13 illustrates an example of a buffer set having a reduced size according to the third embodiment.

In the following, a divided buffer set will be described with reference to FIG. 13. FIG. 13 illustrates an example of a buffer set having a reduced size according to the third embodiment.

A buffer set 611 is a buffer set including only one individual buffer of the controller module #00 of single individual buffers (individual buffers with an offset "7" indicated by hatching in FIG. 13) of the respective controller modules. Accordingly, the number of individual buffers included in the buffer set 611 is "1", which corresponds to the controller module #00. The same applies to the buffer sets 612, 613, and 614.

The buffer sets 611, 612, 613, and 614 are of different generations. Accordingly, as for the REC buffers of the controller modules #00 through #23, since the division number is "24" and the number of offsets is "8", buffer sets for 192 generations are formed.

With the buffer sets 611, 612, 613, and 614, it is possible to reduce the amount of data to be transferred at one time, which reduces the risk of the reception buffer of the copy destination storage apparatus running low. Further, with the buffer sets 611, 612, 613, and 614, it is possible to improve the data filling rate, as compared to the buffer set 600 and the buffer sets 601, 602, and 603.

Figure 14:
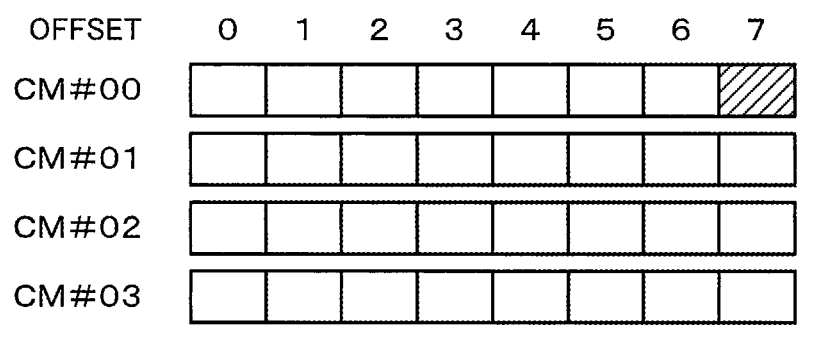

In the following, a reception buffer that stores copy data transferred from a buffer set will be described with reference to FIG. 14. FIG. 14 illustrates an example of a reception buffer according to the third embodiment.

The reception buffer illustrated in FIG. 14 is of a copy destination storage apparatus including four controller modules. The reception buffer is set in REC buffers of the respective controller modules. Since the number of offsets is "8" and the number of controller modules is "4", the size of the reception buffer is "32 (=8×4)".

Accordingly, even when data with a buffer set size of "1" is transferred from the buffer set 611 of FIG. 13, it is possible to accept data transfer 32 (=32/1) times. That is, a reduction in buffer set size reduces the risk of the reception buffer running low.

(d) Fourth Embodiment

Figure 15:
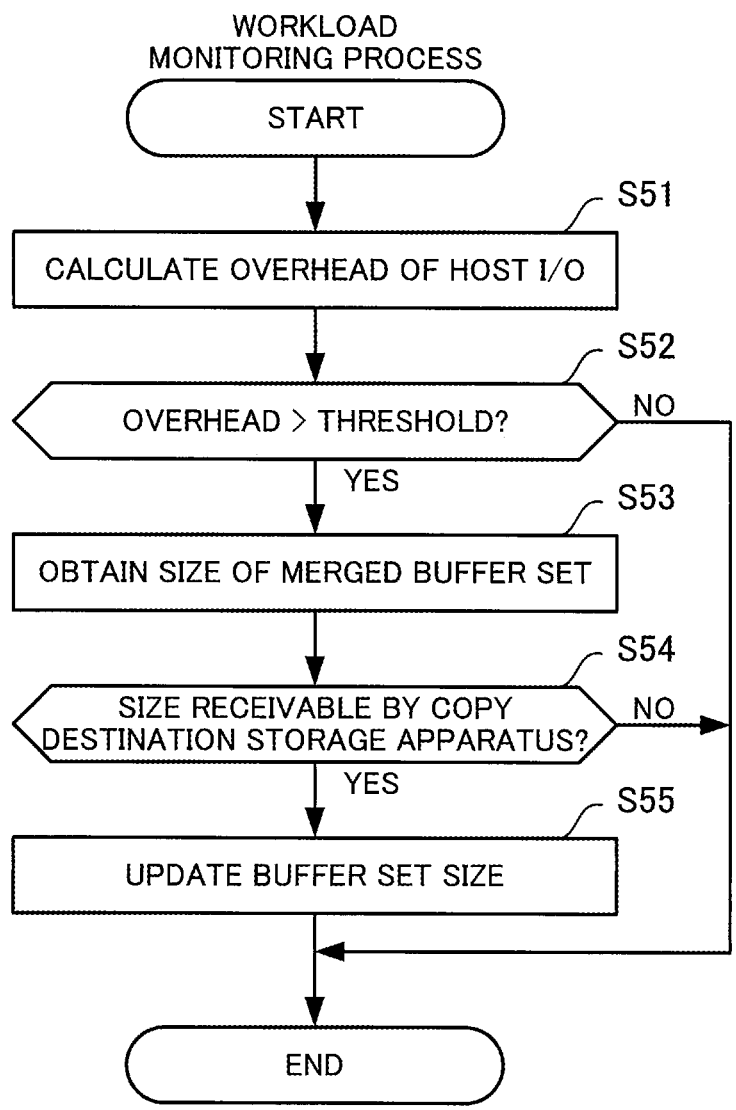
FIG. 15 is a flowchart of a workload monitoring process according to a fourth embodiment.

In the following, a storage system according to a fourth embodiment will be described with reference to FIGS. 15 through 17. The storage system of the third embodiment reduces the buffer set size based on the imbalance status of the REC buffer filling rate. When the size of the buffer set is reduced, the number of times of switching between buffer sets increases. Since a host I/O is suspended when switching between buffer sets, the overhead of the host I/O increases as the number of times of switching between buffer sets increases. Thus, the storage system of the fourth embodiment is different from the storage system of the third embodiment in increasing the size of a buffer set based on the overhead of a host I/O.

First, a workload monitoring process will be described with reference to FIG. 15. FIG. 15 is a flowchart of a workload monitoring process according to the fourth embodiment. The workload monitoring process is executed regularly or irregularly by the copy master controller module. The process may be executed regularly at predetermined time intervals (for example, time intervals of 24 hours), at scheduled time (for example, at midnight on May 20), or the like. The process may be executed irregularly in response to reception of an execution request from the host 50, detection of a change to the configuration of the copy source storage apparatus, detection of an idle state, or the like. Further, the workload monitoring process may be executed after the buffer set dividing process so as to correct the buffer set size that is reduced by the buffer set dividing process.

Note that in the case where the controller module 300 executes a workload monitoring process as a copy master controller module, the processor 301 executes a predetermined program stored in the memory 302 so as to implement the copy master control unit.

(Step S51) The copy master control unit calculates the overhead of a host I/O (for example, response time) as the workload of buffer set division. The overhead of the host I/O may be calculated from the operation information that is collected from each controller module in the operation information reporting process described in the third embodiment, or may be calculated using the operation information of the copy master controller module as a representative value.

(Step S52) The copy master control unit determines whether the overhead of the host I/O is greater than a predetermined threshold. If the overhead of the host I/O is greater than the threshold, the process proceeds to step S53.

If the overhead of the host I/O is not greater than the threshold, the workload monitoring process ends.

(Step S53) The copy master control unit obtains the size of a buffer set resulting from merging two or more buffer sets.

(Step S54) The copy master control unit determines whether the merged buffer set size is the size receivable by the copy destination storage apparatus. A determination of whether the merged buffer set size is the size receivable by the copy destination storage apparatus is made based on comparison between the merged buffer set size and the size of the reception buffer of the copy destination storage apparatus. If the merged buffer set size is the size receivable by the copy destination storage apparatus, the process proceeds to step S55. If the merged buffer set size is not the size receivable by the copy destination storage apparatus, the workload monitoring process ends.

(Step S55) The copy master control unit updates the buffer set size to the merged buffer set size. Then, the workload monitoring process ends.

In the following, a merged buffer set will be described with reference to FIG. 16. FIG. 16 illustrates an example of a buffer set having a reduced size according to the fourth embodiment.

Figure 16:
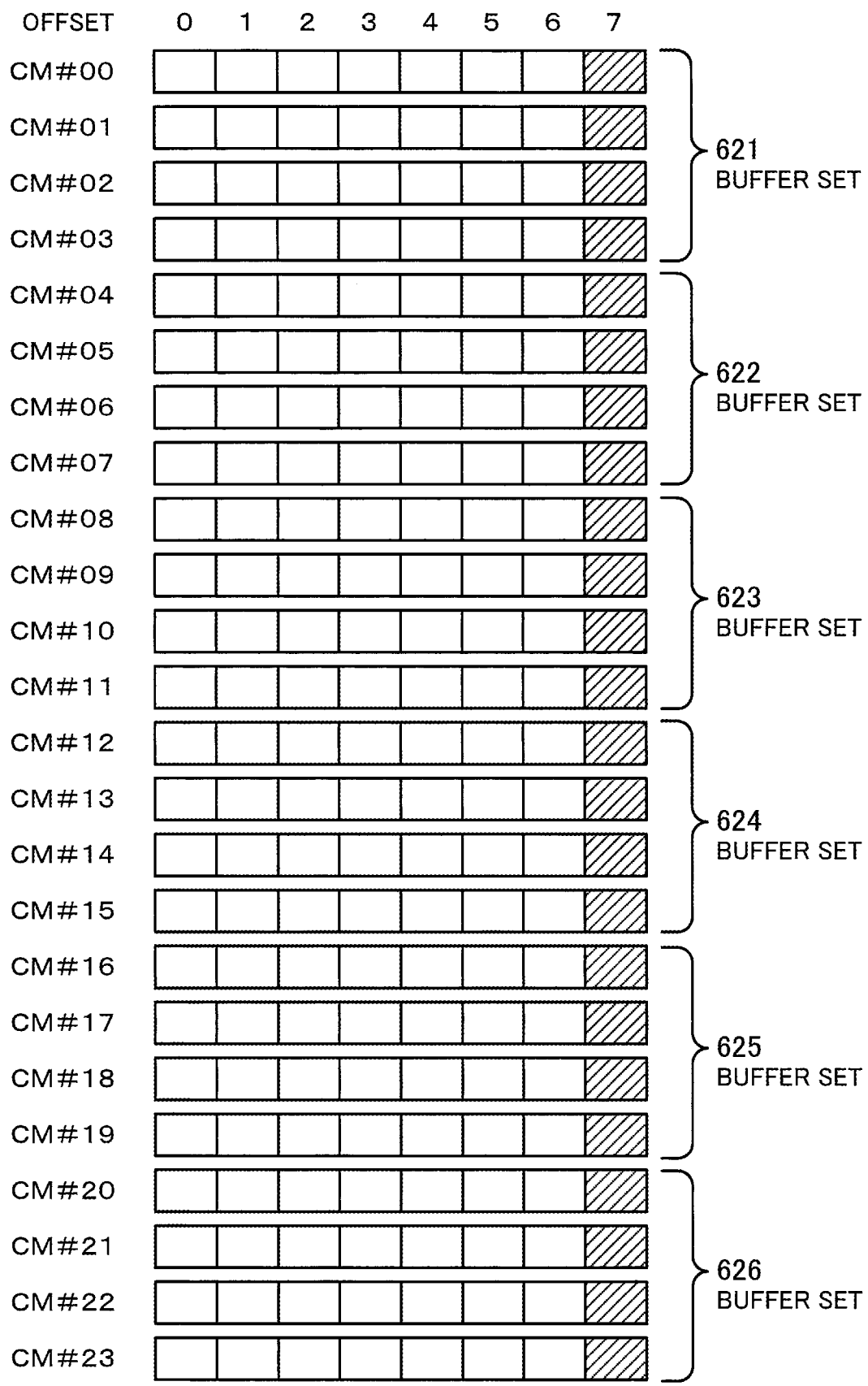
FIG. 16 illustrates an example of a buffer set having a reduced size according to the fourth embodiment.

A buffer set 621 is a buffer set as a group of single individual buffers (individual buffers with an offset "7" indicated by hatching in FIG. 16) of the 4 respective controller modules, namely, controller modules #00 through #03. Accordingly, the number of individual buffers included in the buffer set 621 is "4", which corresponds to the controller modules #00 through #03. The same applies to the buffer sets 622 through 626.

The buffer sets 621 through 626 are of different generations. Accordingly, as for the REC buffers of the controller modules #00 through #23, since the division number is "6" and the number of offsets is "8", buffer sets for 48 generations are formed.

With the buffer sets 621 through 626, it is possible to reduce the amount of data to be transferred at one time, and also to reduce the overhead of the host I/O. Thus, with the buffer sets 621 through 626, the risk of the reception buffer of the copy destination storage apparatus running low is reduced. Further, with the buffer sets 621 through 626, it is possible to improve the data filling rate, as compared to the buffer set 600. Further, with the buffer sets 621 through 626, the response to the host I/O in the copy source storage apparatus is improved.

In the following, a reception buffer that stores copy data transferred from a buffer set will be described with reference to FIG. 17. FIG. 17 illustrates an example of a reception buffer according to the fourth embodiment.

Figure 17:
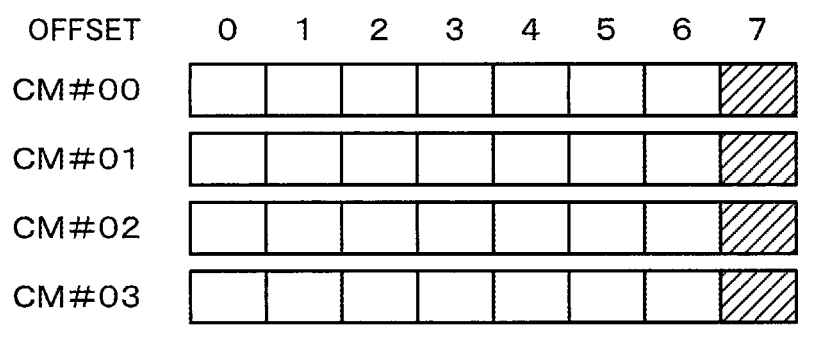

The reception buffer illustrated in FIG. 17 is of a copy destination storage apparatus including four controller modules. The reception buffer is set in REC buffers of the respective controller modules. Since the number of offsets is "8" and the number of controller modules is "4", the size of the reception buffer is "32 (=8×4)".

Accordingly, even when data with a buffer set size of "4" is transferred from the buffer set 621 of FIG. 16, it is possible to accept data transfer 8 (=32/4) times. That is, the reception buffer has a reduced risk of running low, while allowing a reduction in overhead of the host I/O in the copy source storage apparatus.

The above-described processing functions may be implemented by a computer. In this case, a program describing operations of the functions of the storage apparatus 1, the storage control apparatus 1a, and the controller modules 300 and 310 is provided. When the program is executed by a computer, the above-described processing functions are implemented on the computer. The program describing operations of the functions may be stored in a computer-readable storage medium. Examples of computer-readable storage media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include digital versatile disk (DVD), DVD-RAM, CD-ROM, CD-RW, and the like. Examples of magneto-optical storage media include magneto-optical disk (MO) and the like.

For distributing the program, the program may be stored and sold in the form of a portable storage medium such as DVD, CD-ROM, and the like, for example. The program may also be stored in a storage device of a server computer, and transferred from the server computer to other computers via a network.

For executing the program on a computer, the computer stores the program recorded in the portable storage medium or the program transferred from the server computer in its storage device. Then, the computer reads the program from its storage device, and performs processing in accordance with the program. The computer may read the program directly from the portable storage medium, and execute processing in accordance with the program. Further, the computer may sequentially receive the program from a server computer connected over a network, and perform processing in accordance with the received program.

The above-described processing functions may also be implemented wholly or partly by using electronic circuits such as DSP, ASIC, PLD, and the like.

According to one aspect, it is possible to prevent a reduction in data filling rate on a per buffer set basis in sequence-guaranteed remote copying.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus that controls copying of data from a first storage apparatus including a plurality of controller modules to a second storage apparatus, the storage control apparatus comprising:
   a memory configured to store configuration information including:
      a buffer count indicating a number of constituent transmission buffers constituting individual buffer sets respectively used to transmit data in different generations corresponding to an update sequence, and
      information indicating constituent transmission buffers included in each of the individual buffer sets; and
   a processor coupled to the memory, the processor being configured to perform a procedure including:
      setting the configuration information by selecting a plurality of non-overlapping groups of transmission buffers out of a plurality of transmission buffers respectively included in the plurality of controller modules and assigning the plurality of non-overlapping groups respectively as different buffer sets for different generations including a current generation, the plurality of non-overlapping groups each being formed from as many transmission buffers as the buffer count, statistically evaluating data filling rates of transmission buffers in each of the controller modules and comparing evaluation results with a predetermined threshold, the data filling rates each indicating a percentage of stored data with respect to a storage capacity of an individual transmission buffer, when the data filling rates of transmission buffers indicate a statistical imbalance, reducing a size of individual buffer sets by changing the buffer count, determining a storage location of copy target data managed by a first controller module of the plurality of controller modules, based on the configuration information, storing the copy target data into a first transmission buffer included in the first controller module when the first transmission buffer is included in a current buffer set for the current generation, and storing the copy target data into a second transmission buffer that is included in a second controller module and belongs to the current buffer set when the first transmission buffer is not included in the current buffer set.

2. The storage control apparatus according to claim 1, wherein the procedure further includes increasing the size of individual buffer sets by changing the buffer count, based on a workload placed on each of the controller modules that include transmission buffers belonging to the current buffer set.

3. The storage control apparatus according to claim 1, wherein the first controller module serves as the storage control apparatus.

4. A non-transitory computer-readable storage medium storing a storage control program for controlling copying of data from a first storage apparatus including a plurality of controller modules to a second storage apparatus, the storage control program causes a computer to perform a procedure comprising:

configuring a memory in the computer to store configuration information including:
a buffer count indicating a number of constituent transmission buffers constituting individual buffer sets respectively used to transmit data in different generations corresponding to an update sequence, and
information indicating constituent transmission buffers included in each of the individual buffer sets;

setting the configuration information by selecting a plurality of non-overlapping groups of transmission buffers out of a plurality of transmission buffers respectively included in the plurality of controller modules and assigning the plurality of non-overlapping groups respectively as different buffer sets for different generations including a current generation, the plurality of non-overlapping groups each being formed from as many transmission buffers as the buffer count;

statistically evaluating data filling rates of transmission buffers in each of the controller modules and comparing evaluation results with a predetermined threshold, the data filling rates each indicating a percentage of stored data with respect to a storage capacity of an individual transmission buffer;

when the data filling rates of transmission buffers indicate a statistical imbalance, reducing a size of individual buffer sets by changing the buffer count;

determining a storage location of copy target data managed by a first controller module of the plurality of controller modules, based on the configuration information;

storing the copy target data into a first transmission buffer included in the first controller module when the first transmission buffer is included in a current buffer set for the current generation, and storing the copy target data into a second transmission buffer that is included in a second controller module and belongs to the current buffer set when the first transmission buffer is not included in the current buffer set.

5. A storage system comprising:
a first storage apparatus including a plurality of controller modules;
a second storage apparatus; and
a storage control apparatus that controls copying of data from the first storage apparatus to the second storage apparatus, the storage control apparatus includes:
a memory configured to store configuration information including:
a buffer count indicating a number of constituent transmission buffers constituting individual buffer sets respectively used to transmit data in different generations corresponding to an update sequence, and
information indicating constituent transmission buffers included in each of the individual buffer sets; and
a processor coupled to the memory, the processor being configured to perform a procedure including:
setting the configuration information by selecting a plurality of non-overlapping groups of transmission buffers out of a plurality of transmission buffers respectively included in the plurality of controller modules and assigning the plurality of non-overlapping groups respectively as different buffer sets for different generations including a current generation, the plurality of non-overlapping groups each being formed from as many transmission buffers as the buffer count, statistically evaluating data filling rates of transmission buffers in each of the controller modules and comparing evaluation results with a predetermined threshold, the data filling rates each indicating a percentage of stored data with respect to a storage capacity of an individual transmission buffer, when the data filling rates of transmission buffers indicate a statistical imbalance, reducing a size of individual buffer sets by changing the buffer count, determining a storage location of copy target data managed by a first controller module of the plurality of controller modules, based on the configuration information, storing the copy target data into a first transmission buffer included in the first controller module when the first transmission buffer is included in a current buffer set for the current generation, and storing the copy target data into a second transmission buffer that is included in a second controller module and belongs to the current buffer set when the first transmission buffer is not included in the current buffer set.

6. The storage control apparatus according to claim 1, wherein the statically evaluating includes calculating a statistical variance of the data filling rates.

7. A storage control apparatus that controls copying of data from a first storage apparatus including a plurality of controller modules to a second storage apparatus, the storage control apparatus comprising:
- a memory configured to store configuration information including:
    - a buffer count indicating a number of constituent transmission buffers constituting individual buffer sets respectively used to transmit data in different generations corresponding to an update sequence, and
    - information indicating constituent transmission buffers included in each of the individual buffer sets; and
- a processor coupled to the memory, the processor being configured to perform a procedure including:
    - setting the configuration information by selecting a plurality of non-overlapping groups of transmission buffers out of a plurality of transmission buffers respectively included in the plurality of controller modules and assigning the plurality of non-overlapping groups respectively as different buffer sets for different generations including a current generation, the plurality of non-overlapping groups each being formed from as many transmission buffers as the buffer count,
    - determining a storage location of copy target data managed by a first controller module of the plurality of controller modules, based on the configuration information,
    - storing the copy target data into a first transmission buffer included in the first controller module when the first transmission buffer is included in a current buffer set for the current generation,
    - storing the copy target data into a second transmission buffer that is included in a second controller module and belongs to the current buffer set when the first transmission buffer is not included in the current buffer set, and
    - varying a size of individual buffer sets by changing the buffer count.

8. The storage control apparatus according to claim 7, wherein the varying of the size includes reducing the size of individual buffer sets by changing the buffer count, based on data filling rates of individual transmission buffers included in the current buffer set.

* * * * *